(12) United States Patent
Ouchi et al.

(10) Patent No.: US 7,825,212 B2
(45) Date of Patent: Nov. 2, 2010

(54) POLYLACTIC ACID RESIN AND COMPOSITION AND MOLDED ARTICLE OF THE SAME

(75) Inventors: Makoto Ouchi, Kyoto (JP); Hirotaka Okamoto, Aichi-gun (JP); Mitsuru Nakano, Nagoya (JP); Arimitsu Usuki, Nagoya (JP); Takeshi Kanamori, Nagoya (JP); Hisashi Okuyama, Nishikamo-gu (JP); Naomi Okuyama, legal representative, Kyoto (JP); Seiji Yamashita, Susono (JP); Yuji Kageyama, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 853 days.

(21) Appl. No.: 10/584,471

(22) PCT Filed: Dec. 21, 2004

(86) PCT No.: PCT/JP2004/019673

§ 371 (c)(1),
(2), (4) Date: Aug. 31, 2006

(87) PCT Pub. No.: WO2005/063885

PCT Pub. Date: Jul. 14, 2005

(65) Prior Publication Data

US 2008/0097074 A1    Apr. 24, 2008

(30) Foreign Application Priority Data

Dec. 25, 2003    (JP)    ............... 2003-430455

(51) Int. Cl.
*C08G 63/08*    (2006.01)
*C08L 69/00*    (2006.01)
*C08L 67/00*    (2006.01)

(52) U.S. Cl. ............... 528/354; 525/418; 525/450; 524/9; 524/537; 524/539; 524/599

(58) Field of Classification Search ............... 525/418, 525/540, 450; 524/9, 599, 537, 539; 528/354
See application file for complete search history.

(56) References Cited

FOREIGN PATENT DOCUMENTS

| JP | 55131047 A | * | 10/1980 |
| JP | A 9-278991 | | 10/1997 |
| JP | 2003128900 A | * | 5/2003 |
| JP | A 2003-128900 | | 5/2003 |
| JP | 2003192884 A | * | 7/2003 |
| JP | A 2003-192884 | | 7/2003 |
| JP | A 2004-99703 | | 4/2004 |
| WO | WO 03/042302 A1 | | 5/2003 |

* cited by examiner

*Primary Examiner*—David Wu
*Assistant Examiner*—Michael M Bernshteyn
(74) *Attorney, Agent, or Firm*—Oliff & Berridge, PLC

(57) ABSTRACT

This invention provides a polylactic acid resin composition in which stereocomplex crystals of poly-L-lactic acid and poly-D-lactic acid can be selectively crystallized to obtain polylactic acid having a sufficiently high speed of crystallization and a sufficiently high ratio of stereocomplex crystal and a molded article thereof obtained via melt molding and crystallization of the same. Such polylactic acid resin composition comprises polylactic acid capable of generating stereocomplex crystallization and an aromatic urea compound represented by formula (1):

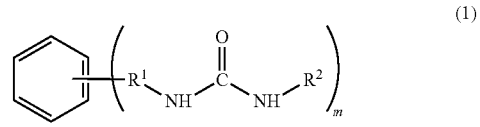

(1)

wherein $R^1$ represents an alkylene group having 1 to 10 carbon atoms; $R^2$ represents an alkyl group having 1 to 25 carbon atoms; and m is an integer between 1 to 6.

4 Claims, 9 Drawing Sheets

POLYLACTIC ACID RESIN AND COMPOSITION AND MOLDED ARTICLE OF THE SAME

TECHNICAL FIELD

The present invention relates to a polylactic acid resin composition and a molded article obtained by melt molding and crystallizing the same.

BACKGROUND ART

Polylactic acid decomposes as a result of the action of microbes and enzymes; that is, it is biodegradable. It is converted into lactic acid or carbon dioxide and water that are harmless to the human body. Thus, polylactic acid has attracted attention as an alternative to medical materials and general-purpose resins. Although polylactic acid is a crystalline resin, it is crystallized at a low rate, and it exhibits features practically similar to those of noncrystalline resins. Namely, polylactic acid is softened rapidly and extremely at about the glass transition temperature (typically, less than 1/100 in terms of elastic modulus), and thus, it has been difficult to attain sufficient properties in terms of heat resistance, moldability, mold releasability, and the like.

As a measure of overcoming such disadvantages, JP Patent Publication (Kokai) No. 9-278991 (Patent Document 1) discloses a method for producing an aliphatic polyester molded product, wherein an aliphatic polyester composition comprising a aliphatic polyester, which does not produce a crystal upon a drop of temperature from the melting point to the glass transition temperature at a rate of 10° C./min, and at least one transparent nucleating agent selected from the group of compounds consisting of an aliphatic carboxylic acid amide, an aliphatic carboxylate, an aliphatic alcohol, and an aliphatic carboxylic acid ester having a melting temperature of 40° C. to 300° C. is molded, and the aliphatic polyester compound is thermally treated during or after the molding. Examples of aliphatic carboxylic acid amides include aliphatic monocarboxylic acid amides, N-substituted aliphatic monocarboxylic acid amides, aliphatic biscarboxylic acid amides, N-substituted aliphatic carboxylic bisamides, and N-substituted ureas.

JP Patent Publication (Kokai) No. 9-278991, however, does not describe stereocomplex crystals. The crystallinity of the aliphatic polyester molded article disclosed in this publication is substantially homogeneous, and improvement in heat resistance and crystallization speed is not yet sufficient.

JP Patent Publication (Kokai) No. 2003-128900 (Patent Document 2) discloses the use of a polylactic acid stereocomplex obtained by mixing poly-L-lactic acid (PLLA) and poly-D-lactic acid (PDLA) in a molten state. This publication describes that the polylactic acid stereocomplex has a high melting point and a high crystallinity and that molded articles excellent in heat resistance can be obtained.

JP Patent Publication (Kokai) No. 2003-192884 (Patent Document 3) discloses a polylactic acid-based polymer composition comprising 100 parts by weight of a polymer (A) capable of generating a stereocomplex that is composed mainly of a polylactic acid comprising a poly-L-lactic acid composed mainly of L-lactic acid and a poly-D-lactic acid composed mainly of D-lactic acid, and 0.01 to 5.0 parts by weight of a metal phosphate (B) as a nucleating agent for crystallization.

Use of the polymer composition described in JP Patent Publication (Kokai) No. 2003-128900 or JP Patent Publication (Kokai) No. 2003-192884, however, results in an insufficient ratio of stereocomplex crystals of poly-L-lactic acid and poly-D-lactic acid. Thus, improvement in heat resistance of the resulting sterocomplex and in the crystallization speed thereof was insufficient.

Patent Document 1: JP Patent Publication (Kokai) No. 9-278991
Patent Document 2: JP Patent Publication (Kokai) No. 2003-128900
Patent Document 3: JP Patent Publication (Kokai) No. 2003-192884

DISCLOSURE OF THE INVENTION

The present invention has been achieved in view of problems with conventional techniques described above, and has an object of providing: a polylactic acid resin composition in which stereocomplex crystals of poly-L-lactic acid and poly-D-lactic acid can be selectively crystallized to obtain polylactic acid having a sufficiently high crystallization speed and high ratio of stereocomplex crystal; and a molded article thereof obtained via melt molding and crystallization of the same.

The present inventors have conducted concentrated studies in order to attain the above object. As a result, they discovered that simple mixing of poly-L-lactic acid and poly-D-lactic acid for crystallization would not produce a molded article with a high ratio of stereocomplex crystal; however, the speed of stereocomplex crystallization and the selectivity of stereocomplex crystallization could be remarkably improved with the addition of an aromatic urea complex having a specific structure as a crystallization accelerator. This has led to the completion of the present invention.

Specifically, the polylactic acid resin composition according to the present invention comprises polylactic acid capable of generating stereocomplex crystallization and an aromatic urea compound represented by formula (1):

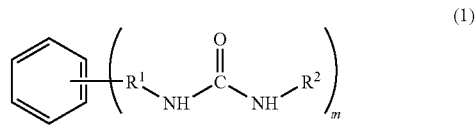

wherein $R^1$ represents an alkylene group having 1 to 10 carbon atoms; $R^2$ represents an alkyl group having 1 to 25 carbon atoms; and m is an integer between 1 to 6.

The molded article according to the present invention is obtained by melt molding and crystallizing a polylactic acid resin composition comprising polylactic acid capable of generating stereocomplex crystallization and an aromatic urea compound represented by formula (1):

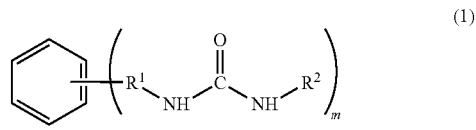

wherein $R^1$ represents an alkylene group having 1 to 10 carbon atoms; $R^2$ represents an alkyl group having 1 to 25 carbon atoms; and m is an integer between 1 to 6.

The polylactic acid capable of generating stereocomplex crystallization according to the present invention is preferably a blend of poly-L-lactic acid and poly-D-lactic acid or a polylactic acid stereoblock copolymer. The aromatic urea compound according to the present invention is preferably xylylene bisstearyl urea.

The molded article of the present invention obtained with the use of the polylactic acid resin composition of the present invention (when a blend of poly-L-lactic acid and poly-D-lactic acid is used as the polylactic acid capable of generating stereocomplex crystallization) is preferably a molded article having the crystallization temperature (i.e., the peak top temperature) calculated based on a drop of temperature from a molten state (cooling rate: 20° C./min) measured by DSC is 140° C. or higher and having the calorific power caused by the crystallization calculated based on the measurements via cooling (peak calorific power) is 0.2X J/g or more, wherein X is two times the smaller value of either the content (A%) of poly-L-lactic acid or the content (B%) of poly-D-lactic acid, provided that A+B=100%.

The term "polylactic acid capable of generating stereocomplex crystallization" refers to a polylactic-acid-based resin that exhibits any peaks peculiar to stereocomplex crystals ($2\theta=12°, 21°, 24°$) upon measurement of the crystallized sample via wide-angle X-ray-diffraction (XRD) (Ikada, Y. et al., Macromolecules 1987, 20, 904-906). Peaks peculiar to homogeneous crystals may be simultaneously observed ($2\theta=15°, 16°, 18.5°, 22.5°$). Examples of such polylactic acid capable of generating stereocomplex crystallization include a blend of polylactic acids having different conformations, such as a blend of poly-L-lactic acid and poly-D-lactic acid, a copolymer of an L-lactic acid unit and a D-lactic acid unit, such as a polylactic acid stereoblock copolymer, and a blend/copolymer thereof with other polymers. Any polymer comprising lactic acid as a basic skeleton may be used alone or in combination.

Methods for crystallizing the polylactic acid capable of generating stereocomplex crystallization are not particularly limited. Examples of such method include: i) a method whereby polylactic acid is dissolved in a solvent and then the solvent is cast; ii) a method whereby polylactic acid is slowly cooled from a heat-induced molten state to around room temperature for crystallization; iii) a method whereby polylactic acid is cooled from a heat-induced molten state to a given temperature and then crystallized at that temperature; and iv) a method whereby polylactic acid is cooled from a heat-induced molten state to around room temperature, heated to a given temperature, and then crystallized at that temperature.

Whether or not a given polylactic acid is capable of generating stereocomplex crystallization is determined via an XRD. FIG. 1 shows an embodiment of an XRD chart representing a sample obtained by crystallizing a 1:1 mixture of PLLA and PDLA (polylactic acid A) by a solvent-cast method. FIG. 2 shows an embodiment of an XRD chart representing a sample obtained by crystallizing a 9:1 mixture of PLLA and PDLA (polylactic acid B) by a solvent-cast method. FIG. 3 shows an embodiment of an XRD chart representing a sample obtained by crystallizing a polylactic acid stereoblock copolymer (polylactic acid C) by a solvent-cast method. FIG. 4 shows an embodiment of an XRD chart representing a sample obtained by crystallizing PLLA (polylactic acid D) by a solvent-cast method. These samples are evaluated in terms of the aforementioned standard. Thus, polylactic acids A to C are determined to be "polylactic acids capable of generating stereocomplex crystallization" according to the present invention, and polylactic acid D is determined to be a "polylactic acid incapable of generating stereocomplex crystallization."

The stereocomplex crystal of poly-L-lactic acid and poly-D-lactic acid is a eutectic crystal in which poly-L-lactic acid molecules and poly-D-lactic acid molecules form a racemic crystal structure. The melting point (melting peak by DSC) of homogeneous crystals of poly-L-lactic acid or poly-D-lactic acid is generally between 160° C. and 180° C. In contrast, the melting point of stereocomplex crystals thereof is generally between 190° C. and 240° C. Such polylactic acid stereocomplex crystals are obtained by crystallizing a polylactic acid capable of generating stereocomplex crystallization, such as a blend of poly-L-lactic acid and poly-D-lactic acid or a polylactic acid stereoblock copolymer.

The present invention provides a polylactic acid resin composition in which stereocomplex crystals of poly-L-lactic acid and poly-D-lactic acid can selectively be crystallized to obtain polylactic acid having a sufficiently high crystallization speed and ratio of stereocomplex crystal, and a molded article having a sufficiently high ratio of stereocomplex crystal and crystallinity that can be obtained by melt molding and crystallizing the polylactic acid resin composition.

This description includes part or all of the contents as disclosed in the description and/or drawings of Japanese Patent Application No. 2003-430455, which is a priority document of the present application.

PREFERRED EMBODIMENTS OF THE INVENTION

Figure 1:
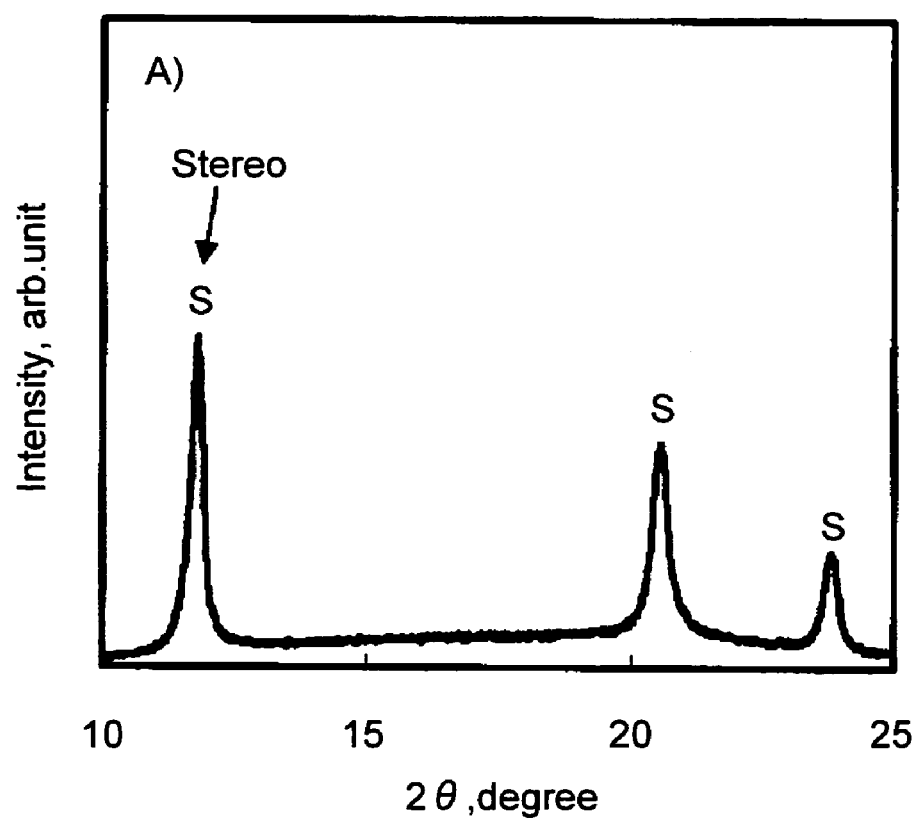
FIG. 1 shows an embodiment of an XRD chart representing a sample obtained by crystallizing a 1:1 mixture of PLLA and PDLA (polylactic acid A) by a solvent-cast method.

Hereafter, the present invention is described in detail with reference to preferred embodiments thereof.

At the outset, a case involving the use of a blend of poly-L-lactic acid and poly-D-lactic acid as polylactic acid is described. Specifically, the first polylactic acid resin composition according to the present invention comprises a blend of poly-L-lactic acid and poly-D-lactic acid and an aromatic urea compound represented by formula (1).

Such poly-L-lactic acid is a polymer having a repeating unit represented by formula (2):

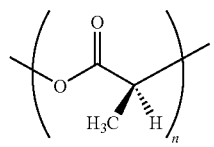

wherein n is an integer. The poly-D-lactic acid is a polymer having a repeating unit represented by formula (3):

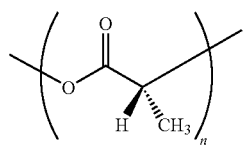

wherein n is an integer. The two have an enantiomorphic relationship.

A method for polymerizing poly-L-lactic acid and poly-D-lactic acid is not particularly limited. It may involve a direct polymerization of L-lactic acid or D-lactic acid, or ring-opening polymerization of L-lactide or D-lactide, which is a cyclic dimer of lactic acid.

The optical purities of the poly-L-lactic acid and the poly-D-lactic acid are each preferably at least 85 mol %, more preferably at least 90 mol %, further preferably at least 95 mol %, and particularly preferably at least 98 mol %. If the optical purities of the poly-L-lactic acid and the poly-D-lactic acid are below the lower limit, the crystallization is inhibited due to deterioration in stereoregularity, which may result in the insufficient effects obtained by the present invention.

Further, the weight-average molecular weight of the poly-L-lactic acid or the poly-D-lactic acid is not particularly limited. It is preferably at least 10,000, more preferably at least 50,000, and further preferably at least 100,000. With a weight-average molecular weight that is below the lower limit, mechanical properties such as strength and elastic modulus tend to become insufficient. The weight-average molecular weight of such poly-L-lactic acid or poly-D-lactic acid is preferably at most 400,000. With a weight-average molecular weight that exceeds the upper limit, molding processability tends to be insufficient.

The first polylactic acid resin composition of the present invention comprises a blend of poly-L-lactic acid and poly-D-lactic acid described above. The blending ratio of the poly-L-lactic acid and the poly-D-lactic acid is preferably 1 to 99% by weight: 99 to 1% by weight, more preferably 30 to 70% by weight: 70 to 30% by weight, and particularly preferably 40 to 60% by weight: 60 to 40% by weight. Larger differences in the contents of the poly-L-lactic acid and the poly-D-lactic acid tend to bring about a lower stereocomplex crystal content in the molded article obtained and to decrease the degree of improvement in crystallization speed.

The method of preparing a blend of poly-L-lactic acid and poly-D-lactic acid is not particularly limited. For example, poly-L-lactic acid and poly-D-lactic acid are mixed using a solvent such as chloroform and the solvent is removed thereafter. Also, poly-L-lactic acid and poly-D-lactic acid may be heated and melt mixed at a temperature of about 160° C. to 260° C.

Subsequently, a case involving the use of a polylactic acid stereoblock copolymer as polylactic acid is described. Specifically, the second polylactic acid resin composition according to the present invention comprises a polylactic acid stereoblock copolymer and the aromatic urea compound represented by formula (1) described above.

Such polylactic acid stereoblock copolymer is a polylactic acid block copolymer composed of a segment of an L-lactic acid unit and a segment of a D-lactic acid unit. The method for producing a polylactic acid stereoblock copolymer is not particularly limited. Examples of such method include: (i) a method wherein L-lactide and D-lactide are alternately polymerized; (ii) a method wherein poly-L-lactic acid and poly-D-lactic acid are allowed to react with a polyfunctional compound; and (iii) a method wherein racemic lactides are stereoselectively polymerized with the aid of a bulky aluminum compound. Methods (i) and (ii) are disclosed in JP Patent Publication (Kokai) No. 2002-356543, and method (iii) is disclosed in the Journal of the American Chemical Society, 2002, 127, 1316-1326.

The weight-average molecular weight of the polylactic acid stereoblock copolymer is not particularly limited. It is preferably at least 10,000, more preferably at least 50,000, and further preferably at least 100,000. With a weight-average molecular weight that is below the lower limit, mechanical properties such as strength and elastic modulus tend to become insufficient. The weight-average molecular weight of such polylactic acid stereoblock copolymer is preferably at most 400,000. With a weight-average molecular weight that exceeds the upper limit, molding processability tends to be insufficient.

The second polylactic acid resin composition of the present invention comprises such polylactic acid stereoblock copolymer. The blending ratio of the segment of an L-lactic acid unit and the segment of a D-lactic acid unit in the polylactic acid stereoblock copolymer is preferably 1 to 99 mol %: 99 to 1 mol %, more preferably 10 to 90 mol %: 90 to 10 mol %, and particularly preferably 20 to 80 mol %: 80 to 20 mol %. Larger differences in the contents of the segment of L-lactic acid unit and the segment of D-lactic acid unit tend to bring about a lower content of the stereocomplex crystals in the molded article obtained and to decrease the degree of improvement in crystallization speed. Lactic acids in a segment constituting the stereocomplex crystal are preferably at least 10 continuous identical optical isomers of the same type (L-lactic acid or D-lactic acid).

The crystallization accelerator (the nucleating agent) according to the present invention is next described. Specifically, the polylactic acid resin composition of the present invention comprises a blend of poly-L-lactic acid and poly-D-lactic acid or a polylactic acid stereoblock copolymer as described above and an aromatic urea compound represented by formula (1).

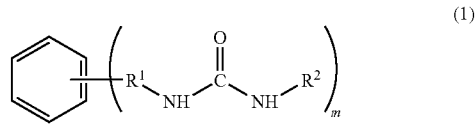

In this formula, $R^1$ represents an alkylene group having 1 to 10 carbon atoms, preferably an alkylene group having 1 to 6 carbon atoms, and more preferably an alkylene group having 1 to 3 carbon atoms. If an alkylene group represented by $R^1$ has 11 or more carbon atoms, the crystal structure of the aromatic urea compound becomes complicated, and the effects thereof as a crystallization accelerator are deteriorated. In contrast, the absence of $R^1$ results in a lowered stereocomplex crystal content in the resulting molded article of polylactic acid and deteriorated effects of improving the speed and degree of crystallization. $R^1$ may represent a linear or branched alkylene group.

In the above formula, $R^2$ represents an alkyl group having 1 to 25 carbon atoms, preferably an alkyl group having 6 to 22 carbon atoms, and more preferably an alkyl group having 10 to 20 carbon atoms. If an alkyl group represented by $R^2$ has 26 or more carbon atoms, the crystal structure of the aromatic urea compound becomes complicated, and the effects thereof as a crystallization accelerator are deteriorated. When $R^2$ represents a hydrogen atom, decomposition of polylactic acid is accelerated, and thus, a hydrogen atom is not preferable. $R^2$ may represent a linear or branched alkyl group.

In the above formula, m is an integer between l and 6, preferably between 1 and 3, and particularly preferably 2. When m is 2, the substituent is preferably attached to the benzene ring at the meta (m-) or para (p-) position.

According to the present invention, addition of an aromatic urea compound having such a specific structure as a crystallization accelerator results in remarkable improvement in the speed and the selectivity of stereocomplex crystallization. In particular, use of xylylene bisstearyl urea tends to produce remarkable effects.

The mechanisms of the aromatic urea compound for producing such effects are not clear, although the present inventors have made the following deductions. Specifically, properties required for a polymer crystallization accelerator include: 1) a crystallization accelerator that has satisfactory affinity and dispersibility with a polymer prior to polymer crystallization; and 2) a crystallization accelerator that becomes insoluble and creates a nucleus at the time of polymer crystallization. In contrast, the aforementioned aromatic urea compound has a urea group, which realizes satisfactory affinity with polylactic acid prior to crystallization. Also, such aromatic urea compound may be insoluble at the time of crystallization of polylactic acid due to crystallization upon hydrogen bond of urea groups and due to stacking of aromatic rings.

Further, the homogeneous crystals of polylactic acid and the stereocomplex crystals thereof are composed of polylactic acid molecules having different helix conformations (homogeneous crystals: $10_3$ helix; stereocomplex crystals: $3_1$ helix). Accordingly, it is considered that the molecular structures of crystallization accelerators that are suitable for gathering (crystallizing) these molecules are different from each other. The correlation therebetween has not yet been elucidated, although it is assumed to be as follows. For example, the crystal structure of the aromatic urea compound varies depending on the basic skeleton and substituents of the compound, and thus the helix conformation of polylactic acid suitable for accelerating crystal growth varies. With the use of the aromatic urea compound according to the present invention, growth of the stereocomplelx crystal was selectively and specifically improved.

The content of the aromatic urea compound in the polylactic acid resin composition according to the present invention is preferably 0.05 to 30 parts by weight, more preferably 0.1 to 25 parts by weight, and particularly preferably 0.1 to 20 parts by weight, based on 100 parts by weight of polylactic acid capable of generating stereocomplex crystallization (for example, a blend of poly-L-lactic acid and poly-D-lactic acid or polylactic acid stereoblock copolymer). With a content of the aromatic urea compound that is below the lower limit of the aforementioned range, the stereocomplex crystal content tends to decrease in the resulting molded article, and improvement in the speed and the degree of crystallization tends to be deteriorated. With such content that exceeds the upper limit thereof, the functions of the aromatic urea compound as a plasticizer are potently exhibited, the rigidity of the molded article is likely to be deteriorated, and the appearance of the molded article becomes damaged due to bleedout of a nucleating agent.

Meanwhile, the polylactic acid resin composition of the present invention may further comprise additives such as a filler, such as talc or a lamellar clay mineral (preferably organized by an organic onium salt), a plasticizer, a pigment, a stabilizer, an antistatic agent, an ultraviolet absorbent, an antioxidant, a flame retarder, a mold releasing agent, a lubricant, a dye, an antibacterial agent, or a terminal blocking agent, as long as the properties of the composition are not damaged. The content of these additives is preferably 20% by weight or lower in the polylactic acid resin composition of the present invention.

Next, the molded article of the present invention will be illustrated. That is, the molded article of the present invention is obtained by melt molding and crystallizing the polylactic acid resin composition of the present invention described above.

In production of the molded article of the present invention, the temperature for melting the polylactic acid resin composition is preferably between 160° C. and 260° C. With a temperature that is below the lower limit, the melting of the polylactic acid resin composition tends to be insufficient, and the homogeneous dispersion of the components tends to be difficult. In contrast, with a temperature that exceeds the upper limit, the properties of the obtained molded article tend to be deteriorated because of the decreased molecular weight of the polylactic acid.

The retention time at the aforementioned melting temperature is preferably between 0.1 minutes and 30 minutes. With a retention time that is below the lower limit, the crystallization of the polylactic acid in the obtained molded article tends to be insufficient. In contrast, with a retention time that exceeds the upper limit, the properties of the obtained molded article tend to be deteriorated because of the decreased molecular weight of the polylactic acid.

A method of crystallizing the molten polylactic acid resin composition preferably involves cooling from the molten state to a temperature of 30° C. to 160° C., and retaining such temperature for 10 seconds to 30 minutes. With a retention time that is below the lower limit, the crystallization of the obtained molded article tends to be insufficient. In contrast, with a retention time that exceeds the upper limit, a long period of time is needed to obtain the molded article, which is unfavorable from the viewpoint of practicality.

In production of the molded article of the present invention, the molding method is not particularly limited, and any of injection molding, extrusion molding, blow molding, inflation molding, profile extrusion molding, injection-blow molding, vacuum-pressure molding, spinning, and the like can adequately be employed. Since a sufficiently high speed of crystallization is achieved with the use of the polylactic acid resin composition of the present invention, for example, polylactic acid having a sufficient crystallinity and a high ratio of stereocomplex crystal can be obtained even when injection molding is performed. The shape, thickness, and the like of the molded article of the present invention are not particularly limited, and it may be in the form of any of an injection molded article, extrusion molded article, compression molded article, blow molded article, sheet, film, yarn, fabric, or the like.

The molded article of the present invention obtained with the use of the polylactic acid resin composition of the present invention (when a blend of poly-L-lactic acid and poly-D- lactic acid is used as the polylactic acid capable of generating stereocomplex crystallization) is preferably a molded article having the crystallization temperature (i.e., the peak top temperature) calculated based on a drop of temperature from a molten state (cooling rate: 20° C./min) measured by DSC is 140° C. or higher and having the calorific power caused by the crystallization calculated based on the measurements via cooling (peak calorific power) is 0.2X J/g or more, wherein X is two times the smaller value of either the content (A%) of poly-L-lactic acid or the content (B%) of poly-D-lactic acid, provided that A+B=100%. The ratio of stereocomplex crystal $\{(\Delta Hm, stereo/(\Delta Hm, homo+\Delta Hm, stereo))\times 100(\%)\}$ calculated from a melting endotherm ($\Delta Hm$, homo) of a homogeneous crystal melting peak and a melting endotherm ($\Delta Hm$, stereo) of a stereocomplex crystal melting peak measured by DSC measurement (differential scanning calorimetry) is more preferably at least 0.6X%. With the proviso that the total of the content ratio (A%) of the poly-L-lactic acid and the content ratio (B%) of the poly-D-lactic acid in the polylactic acid resin composition is 100% (A+B=100%), X is two times the smaller value (%) of either the content ratio (A%) of the poly-L-lactic acid or the content ratio (B%) of the poly-D-lactic acid. Such value is equivalent to the content ratio (theoretical value: X%) of polylactic acids capable of being stereocomplex crystallization. For example, (i) with the proviso that the content ratio (A%) of the poly-L-lactic acid is 50% and that the content ratio (B%) of the poly-D-lactic acid is 50%, the peak calorific power is preferably 20 J/g or higher, and the ratio of stereocomplex crystal is more preferably 60% or higher. (ii) With the proviso that the content ratio (A%) of the poly-L-lactic acid is 30% and that the content ratio (B%) of the poly-D-lactic acid is 70%, the peak calorific power is preferably 12 J/g or higher where the peak top temperature is 140° C. or higher, and the ratio of stereocomplex crystal is more preferably 36% or higher.

As the crystallization temperature (peak top temperature) in the measurements via cooling (the cooling process) is found to be higher range, the speed of crystallization is increased. A larger calorific power (peak calorific power) generated upon crystallization in the measurements via cooling (the cooling process) indicates more satisfactory effects of improvement in the degree of crystallization. A higher ratio of stereocomplex crystal in the crystalline part of the obtained molded article brings about a tendency of improvement in the heat resistance of the molded article.

The evaluation of the crystallization behavior by the DSC above is specifically performed in the following manner. First, a part (5 to 10 mg) of a sample (the polylactic acid resin composition) is heated to 255° C., held at that temperature for 5 min to be melted, and then cooled to 30° C. at a cooling rate of 20° C./min to determine the temperature at which polylactic acid is crystallized (Tc, cool) and the calorific power generated upon crystallization ($\Delta Hc$, cool) (measurements via cooling). After the cooling, the sample is reheated to 255° C. at a heating rate of 10° C./min to determine the crystallization temperature of the polylactic acid (Tc, hot), the calorific power generated upon crystallization ($\Delta Hc$, hot), the melting temperature (Tm, homo) of a homogeneous crystal melting peak for which the peak top emerges at 160° C. to 180° C. and the melting endotherm thereof ($\Delta Hm$, homo), and the melting temperature (Tm, stereo) of a stereocomplex crystal melting peak for which the peak top emerges at 190° C. to 240° C. and the melting endotherm thereof ($\Delta Hm$, stereo) (measurement by reheating). From the melting endotherm ($\Delta Hm$, homo) of a homogeneous crystal melting peak and the melting endotherm ($\Delta Hm$, stereo) of a stereocomplex crystal melting peak measured by DSC measurement, the ratio of stereocomplex crystal {stereocrystal content: ($\Delta Hm$, stereo/($\Delta Hm$, homo+$\Delta Hm$, stereo))×100(%)} is calculated. Here, the crystallization temperature and the melting temperature are allowed to be the peak top temperatures.

When two types of crystallization peaks based on crystallization are observed during the measurements via cooling, the peak that appears at a higher temperature is deemed to be generated upon the stereocomplex crystallization, and the peak that appears at a lower temperature is deemed to be generated upon homogeneous crystallization. When only a single crystallization peak is observed during the measurements via cooling, whether or not it is generated upon the stereocomplex crystallization or homogeneous crystallization is approximately determined based on the ratio of stereocomplex crystal determined by the measurements via reheating. Specifically, when the ratio of stereocrystal is 0.6X% or higher, the crystallization peak results from the stereocomplex crystallization. When such ratio is lower than 0.6X%, the peak is considered to result from homogeneous crystallization. When the crystallization peak is not observed during the measurements via cooling, the speed of crystallization is slow. It is accordingly difficult to produce a molded article with a high ratio of stereocrystal even if the ratio of stereocrystal was measured to be 0.6X% or higher by the measurements via reheating.

Hereafter, the present invention is described in greater detail with reference to examples and comparative examples, although the technical scope of the present invention is not limited thereto.

EXAMPLE 1

D-lactide (100 g), dodecyl alcohol (0.1 g), and tin octylate (100 mg) were placed in a reaction vessel and the reaction vessel was evacuated to $10^{-2}$ mmHg. The temperature was gradually raised while thoroughly agitating the mixture, and held at 160° C. for 1 hour. The obtained reaction product was dissolved in chloroform and added dropwise to methanol to isolate and purify poly-D-lactic acid (PDLA). The weight-average molecular weight of the poly-D-lactic acid thus obtained was about 120,000.

Figure 5:
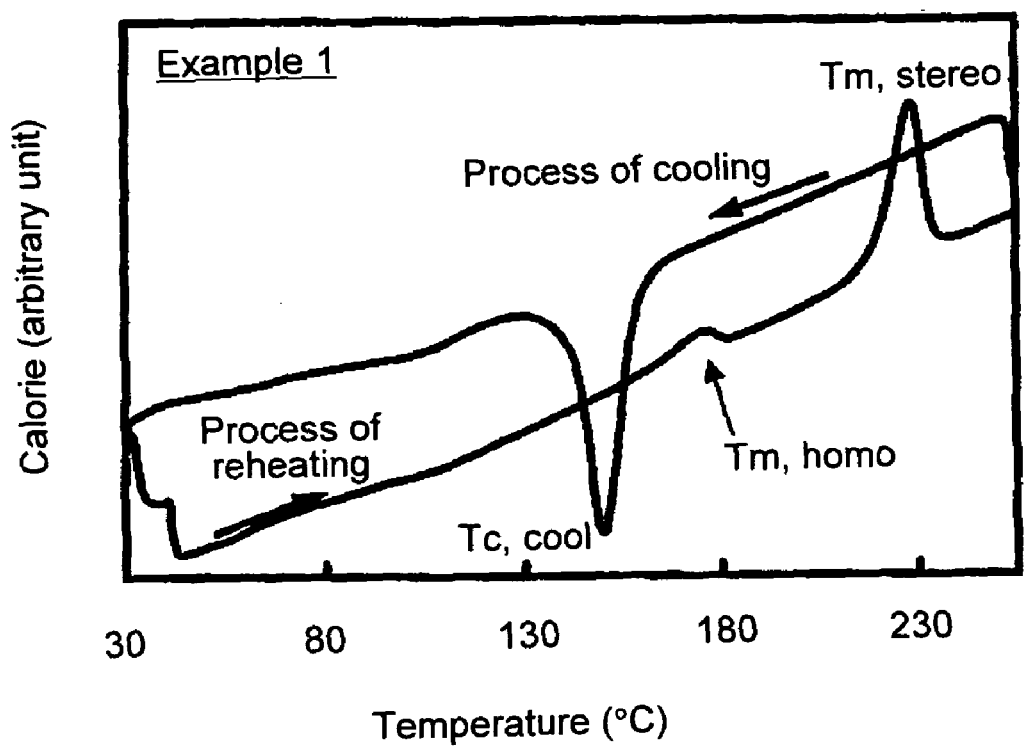
FIG. 5 is a chart showing the results of DSC measurement of a sample, which is a film composed of the polylactic acid resin composition obtained in Example 1.

Subsequently, 0.5 g of poly-L-lactic acid (PLLA #5400, Toyota Motor Corporation, weight-average molecular weight: 140,000; optical purity: 99%), 0.5 g of the poly-D-lactic acid obtained as above (PDLA, weight-average molecular weight: 120,000; optical purity: 99%), and 0.01 g of xylylene bisstearyl urea (Hakreen SX, Nippon Kasei Chemical Co., Ltd.) were mixed with agitation with the aid of 10 ml of chloroform. The obtained mixture was added dropwise to a petri dish and chloroform was removed by atmospheric drying and vacuum drying to prepare a film of a polylactic acid resin composition. The obtained film was subjected to DSC measurement as a sample. The results are shown in Tables 1 and 2 and FIG. 5.

EXAMPLE 2

Figure 6:
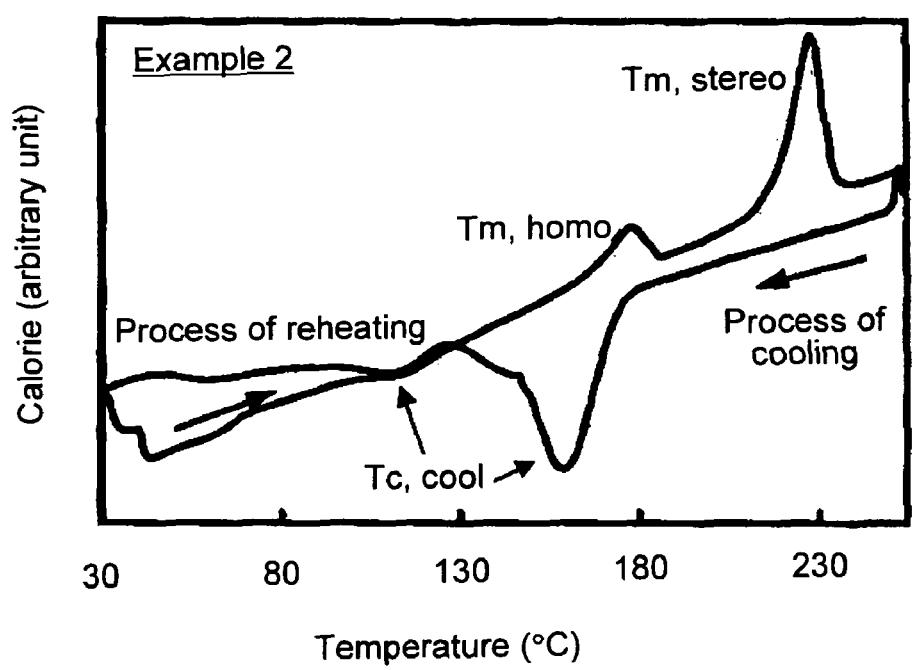
FIG. 6 is a chart showing the results of DSC measurement of a sample, which is a film composed of the polylactic acid resin composition obtained in Example 2.

A film of a polylactic acid resin composition was prepared in the same manner as in Example 1, except that 0.01 g of talc (average particle diameter: 4.0 μm, Micro Ace P-6, Nippon Talc Co., Ltd.) was further added, in addition to poly-L-lactic acid, poly-D-lactic acid, and xylylene bisstearyl urea. The obtained film was subjected to DSC measurement as a sample. The results are shown in Tables 1 and 2 and FIG. 6.

EXAMPLE 3

L-lactide (100 g), 1,12-dodecanediol (3; g), and tin octylate (100 mg) were placed in a reaction vessel and the reaction vessel was evacuated to $10^{-2}$ mmHg. Subsequently, the temperature was gradually raised while thoroughly agitating the mixture, and the mixture was held at 150° C. for 3 hours. The resulting reaction product was dissolved in chloroform and added dropwise to methanol to obtain poly-L-lactic acid (PLLA) having a weight-average molecular weight of approximately 23,000. D-lactide (40 g) and the resulting PLLA (80 g) were homogeneously dissolved therein under a nitrogen atmosphere at 200° C. The resultant was cooled to room temperature, tin octylate (40 mg) was added thereto, and the reaction was allowed to proceed at 150° C. for 3 hours. The obtained reaction product was dissolved in hexafluoroisopropanol, and the resultant was added dropwise to methanol to obtain a polylactic acid stereoblock copolymer (PDLA-PLLA-PDLA) having a weight-average molecular weight of approximately 54,000. Subsequently, L-lactide (20 g) and the obtained PDLA-PLLA-PDLA (80 g) were homogeneously dissolved therein under a nitrogen atmosphere at 220° C. Tin octylate (20 mg) was placed in the reaction vessel, and the reaction was allowed to proceed at 150° C. for 3 hours. The obtained reaction product was dissolved in hexafluoroisopropanol, and the resultant was added dropwise to methanol to obtain a polylactic acid stereoblock copolymer (PLLA-PDLA-PLLA-PDLA-PLLA) having a weight-average molecular weight of approximately 81,000. Further, D-lactide (10 g) and the obtained PLLA-PDLA-PLLA-PDLA-PLLA (80 g) were homogeneously dissolved therein under a nitrogen atmosphere at 240° C. The resultant was cooled to room temperature, tin octylate (10 mg) was added thereto, and the reaction was allowed to proceed at 150° C. for 3 hours. The obtained reaction product was dissolved in hexafluoroisopropanol, and the resultant was added dropwise to methanol to obtain a polylactic acid stereoblock copolymer (PDLA-PLLA-PDLA-PLLA-PDLA-PLLA-PDLA) having a weight-average molecular weight of approximately 115,000.

Figure 7:
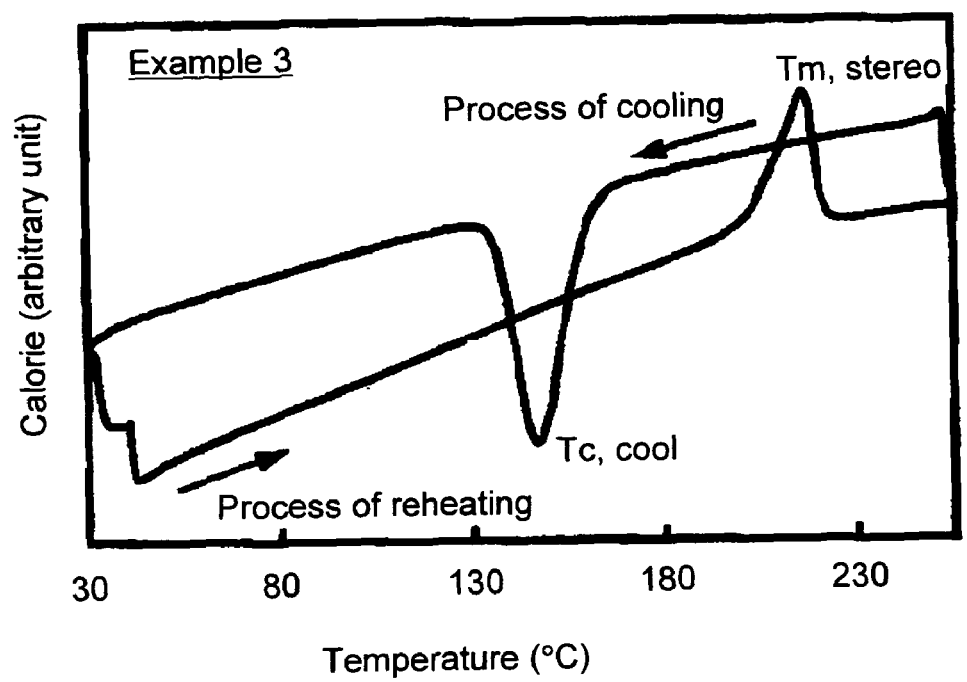
FIG. 7 is a chart showing the results of DSC measurement of a sample, which is a film composed of the polylactic acid resin composition obtained in Example 3.

The stereoblock copolymer obtained above (1.0 g) was mixed with xylylene bisstearyl urea (0.01 g) with agitation with the aid of 10 ml of hexafluoroisopropanol. The resulting mixture was added dropwise to a petri dish, and the solvent was removed by atmospheric drying and vacuum drying to prepare a film of a polylactic acid resin composition. The obtained film was subjected to DSC measurement as a sample. The results are shown in Tables 1 and 2 and FIG. 7.

COMPARATIVE EXAMPLE 1

Figure 8:
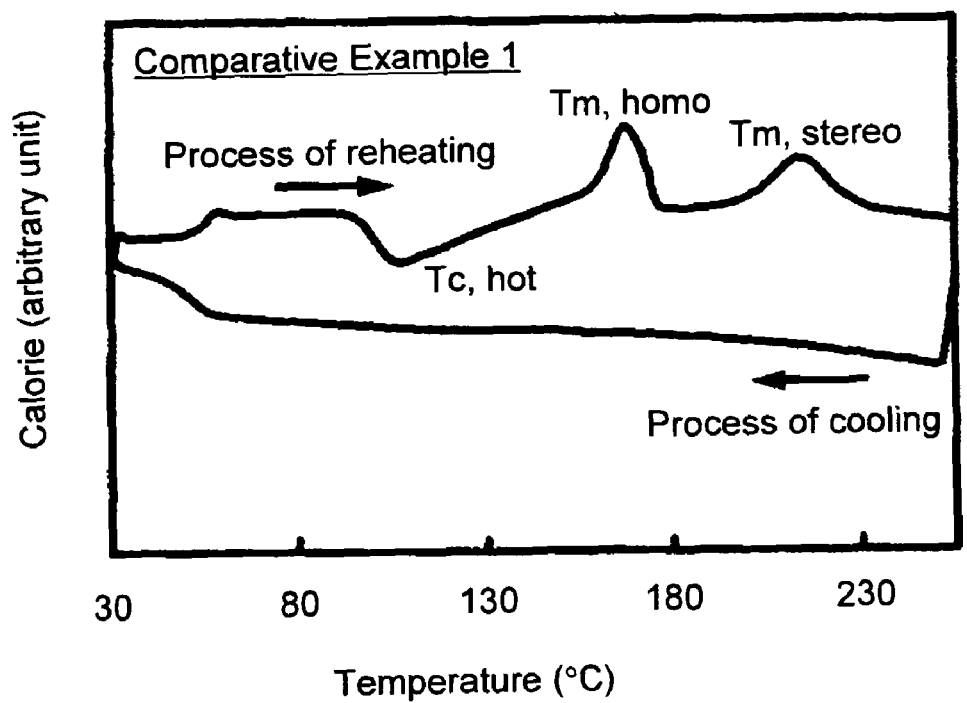
FIG. 8 is a chart showing the results of DSC measurement of a sample, which is a film composed of the polylactic acid resin composition obtained in Comparative Example 1.

A film of a polylactic acid resin composition was prepared in the same manner as in Example 1, except that xylylene bisstearyl urea was not added. The obtained film was subjected to DSC measurement as a sample. The results are shown in Tables 1 and 2 and FIG. 8.

COMPARATIVE EXAMPLE 2

Figure 9:
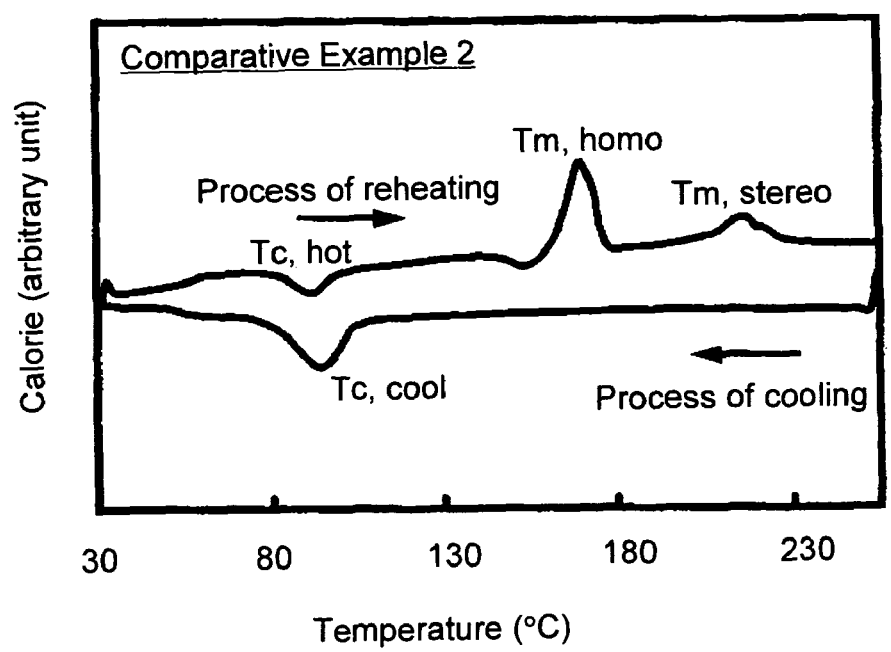
FIG. 9 is a chart showing the results of DSC measurement of a sample, which is a film composed of the polylactic acid resin composition obtained in Comparative Example 2.

A film of a polylactic acid resin composition was prepared in the same manner as in Example 1, except that ethylenebis-12-hydroxystearic acid amide (0.01 g, Slipax H, Nippon Kasei Chemical Co., Ltd.) was used instead of xylylene bisstearyl urea. The obtained film was subjected to DSC measurement as a sample. The results are shown in Tables 1 and 2 and FIG. 9.

COMPARATIVE EXAMPLES 3 TO 5

Films of a polylactic acid resin composition were prepared in the same manner as in Example 1, except for the use of 0.01 g of toluylene bisstearyl urea (Hakreen S T, Nippon Kasei Chemical Co., Ltd., Comparative Example 3), 0.01 g of hexamethylene bisstearyl urea (Hakreen S H, Nippon Kasei Chemical Co., Ltd., Comparative Example 4), and 0.01 g of diphenylmethane bisstearyl urea (Hakreen S M, Nippon Kasei Chemical Co., Ltd., Comparative Example 5), instead of xylylene bisstearyl urea. The obtained films were subjected to DSC measurement as samples. The results are shown in Tables 1 and 2.

COMPARATIVE EXAMPLE 6

A film of a polylactic acid resin composition was prepared in the same manner as in Example 2, except that xylylene bisstearyl urea was not added. The obtained film was subjected to DSC measurement as a sample. The results are shown in Tables 1 and 2.

EXAMPLE 4

A film of a polylactic acid resin composition was prepared in the same manner as in Example 1, except that the amount of xylylene bisstearyl urea added was changed to 0.05 g. The obtained film was subjected to DSC measurement as a sample. The results are shown in Tables 1 and 2.

EXAMPLE 5

A film of a polylactic acid resin composition was prepared in the same manner as in Example 1, except that the amount of xylylene bisstearyl urea added was changed to 0.10 g. The obtained film was subjected to DSC measurement as a sample. The results are shown in Tables 1 and 2.

EXAMPLE 6

A film of a polylactic acid resin composition was prepared in the same manner as in Example 1, except that the amount of xylylene bisstearyl urea added was changed to 0.20 g. The obtained film was subjected to DSC measurement as a sample. The results are shown in Tables 1 and 2.

EXAMPLE 7

A film of a polylactic acid resin composition was prepared in the same manner as in Example 1, except that the amount of PLLA added was changed to 0.6 g, that of PDLA was changed to 0.4 g, and that of xylylene bisstearyl urea was changed to 0.05 g. The obtained film was subjected to DSC measurement as a sample. The results are shown in Tables 1 and 2.

COMPARATIVE EXAMPLE 7

A film of a polylactic acid resin composition was prepared in the same manner as in Example 7, except that xylylene bisstearyl urea was not added. The obtained film was subjected to DSC measurement as a sample. The results are shown in Tables 1 and 2.

EXAMPLE 8

A film of a polylactic acid resin composition was prepared in the same manner as in Example 1, except that the amount of PLLA added was changed to 0.7 g, that of PDLA was changed to 0.3 g, and that of xylylene bisstearyl urea was changed to 0.05 g. The obtained film was subjected to DSC measurement as a sample. The results are shown in Tables 1 and 2.

COMPARATIVE EXAMPLE 8

A film of a polylactic acid resin composition was prepared in the same manner as in Example 8, except that xylylene bisstearyl urea was not added. The obtained film was subjected to DSC measurement as a sample. The results are shown in Tables 1 and 2.

EXAMPLE 9

A film of a polylactic acid resin composition was prepared in the same manner as in Example 1, except that the amount of PLLA added was changed to 0.8 g, that of PDLA was changed to 0.2 g, and that of xylylene bisstearyl urea was changed to 0.05 g. The obtained film was subjected to DSC measurement as a sample. The results are shown in Tables 1 and 2.

COMPARATIVE EXAMPLE 9

A film of a polylactic acid resin composition was prepared in the same manner as in Example 9, except that xylylene bisstearyl urea was not added. The obtained film was subjected to DSC measurement as a sample. The results are shown in Tables 1 and 2.

EXAMPLE 10

A film of a polylactic acid resin composition was prepared in the same manner as in Example 1, except that the amount of PLLA added was changed to 0.9 g, that of PDLA was changed to 0.1 g, and that of xylylene bisstearyl urea was changed to 0.05 g. The obtained film was subjected to DSC measurement as a sample. The results are shown in Tables 1 and 2.

COMPARATIVE EXAMPLE 10

A film of a polylactic acid resin composition was prepared in the same manner as in Example 10, except that xylylene bisstearyl urea was not added. The obtained film was subjected to DSC measurement as a sample. The results are shown in Tables 1 and 2.

TABLE 1

| | Polylactic acid (values in parenthesis indicate wt %) | Nucleating agent | Ratio of Nucleating agent (wt %[*1]) | Talc (wt %[*1]) | Polylactic acid content capable of generating stereocomplex (X %) | 0.2X |
|---|---|---|---|---|---|---|
| Ex. 1 | Blend of PLLA (50) and PDLA (50) | Xylylene bisstearyl urea | 1.0 | — | 100.0 | 20.0 |
| Ex. 2 | Blend of PLLA (50) and PDLA (50) | Xylylene bisstearyl urea | 1.0 | 1.0 | 100.0 | 20.0 |
| Ex. 3 | Polylactic acid stereoblock copolymer (100) | Xylylene bisstearyl urea | 1.0 | — | 100.0 | 20.0 |
| Ex. 4 | Blend of PLLA (50) and PDLA (50) | Xylylene bisstearyl urea | 5.0 | — | 100.0 | 20.0 |
| Ex. 5 | Blend of PLLA (50) and PDLA (50) | Xylylene bisstearyl urea | 10.0 | — | 100.0 | 20.0 |
| Ex. 6 | Blend of PLLA (50) and PDLA (50) | Xylylene bisstearyl urea | 20.0 | — | 100.0 | 20.0 |
| Comp. Ex. 1 | Blend of PLLA (50) and PDLA (50) | — | — | — | 100.0 | 20.0 |
| Comp. Ex. 2 | Blend of PLLA (50) and PDLA (50) | Ethylene-12-hydroxystearic acid amide | 1.0 | — | 100.0 | 20.0 |
| Comp. Ex. 3 | Blend of PLLA (50) and PDLA (50) | Toluylene bisstearyl urea | 1.0 | — | 100.0 | 20.0 |
| Comp. Ex. 4 | Blend of PLLA (50) and PDLA (50) | Hexamethylene bisstearyl urea | 1.0 | — | 100.0 | 20.0 |
| Comp. Ex. 5 | Blend of PLLA (50) and PDLA (50) | Diphenylmethane bisstearyl urea | 1.0 | — | 100.0 | 20.0 |
| Comp. Ex. 6 | Blend of PLLA (50) and PDLA (50) | — | — | 1.0 | 100.0 | 20.0 |
| Ex. 7 | Blend of PLLA (60) and PDLA (40) | Xylylene bisstearyl urea | 5.0 | — | 80.0 | 16.0 |
| Comp. Ex. 7 | Blend of PLLA (60) and PDLA (40) | — | — | — | 80.0 | 16.0 |
| Ex. 8 | Blend of PLLA (70) and PDLA (30) | Xylylene bisstearyl urea | 5.0 | — | 60.0 | 12.0 |
| Comp. Ex. 8 | Blend of PLLA (70) and PDLA (30) | — | — | — | 60.0 | 12.0 |
| Ex. 9 | Blend of PLLA (80) and PDLA (20) | Xylylene bisstearyl urea | 5.0 | — | 40.0 | 8.0 |
| Comp. Ex. 9 | Blend of PLLA (80) and PDLA (20) | — | — | — | 40.0 | 8.0 |
| Ex. 10 | Blend of PLLA (90) and PDLA (10) | Xylylene bisstearyl urea | 5.0 | — | 20.0 | 4.0 |
| Comp. Ex. 10 | Blend of PLLA (90) and PDLA (10) | — | — | — | 20.0 | 4.0 |

[*1]Content relative to 100 parts by weight of polylactic acid (pt. wt.)

TABLE 2

| | Measurements via cooling (20° C./min) | | Measurements via reheating (10° C./min) | | | | | | |
|---|---|---|---|---|---|---|---|---|---|
| | Tc, cool ° C. | ΔHc, cool J/g | Tc, hot ° C. | ΔHc, hot J/g | Tm, homo ° C. | ΔHm, cool J/g | Tm, stereo ° C. | ΔHm, stereo J/g | Ratio of Stereocrystal % |
| Ex. 1 | 149.6 | 42.5 | n.d. | n.d. | 163.0 | 3.0 | 217.7 | 46.3 | 93.9 |
| Ex. 2 | 158.9, 112.3 | 30.4, 3.1 | n.d. | n.d. | 167.4 | 9.2 | 217.7 | 32.6 | 78.0 |
| Ex. 3 | 146.9 | 38.6 | n.d. | n.d. | n.d. | n.d. | 206.0 | 38.0 | 100 |
| Ex. 4 | 165.6, 119.6 | 44.1, 3.2 | n.d. | n.d. | 168.7 | 2.8 | 220.7 | 45.7 | 94.2 |
| Ex. 5 | 156.3 | 50.4 | n.d. | n.d. | n.d. | n.d. | 211.0 | 51.2 | 100 |
| Ex. 6 | 162.9 | 50.0 | n.d. | n.d. | n.d. | n.d. | 217.4 | 50.6 | 100 |
| Comp. Ex. 1 | n.d. | n.d. | 107.6 | 29.6 | 167.7 | 24.6 | 213.4 | 23.1 | 48.4 |
| Comp. Ex. 2 | 94.3 | 17.7 | 91.7 | 11.4 | 169.7 | 24.9 | 216.7 | 16.6 | 40.0 |
| Comp. Ex. 3 | n.d. | n.d. | 107.7 | 31.8 | 171.7 | 24.3 | 221.7 | 20.5 | 45.8 |
| Comp. Ex. 4 | n.d. | n.d. | 97.4 | 28.8 | 170.7 | 23.3 | 220.4 | 22.1 | 48.7 |
| Comp. Ex. 5 | n.d. | n.d. | 101.7 | 28.3 | 171.4 | 27.1 | 221.0 | 21.2 | 43.9 |
| Comp. Ex. 6 | 148.3, 99.6 | 14.2, 3.0 | 103.4 | 12.1 | 167.7 | 20.3 | 214.7 | 22.1 | 52.1 |
| Ex. 7 | 165.6 116.3 | 45.6, 3.7 | n.d. | n.d. | 168.7 | 4.7 | 221.7 | 47.6 | 91.0 |
| Comp. Ex. 7 | n.d. | n.d. | 102.7 | 25.6 | 167.4 | 24.7 | 216.0 | 26.4 | 51.7 |

TABLE 2-continued

| | Measurements via cooling (20° C./min) | | Measurements via reheating (10° C./min) | | | | | | |
|---|---|---|---|---|---|---|---|---|---|
| | Tc, cool °C. | ΔHc, cool J/g | Tc, hot °C. | ΔHc, hot J/g | Tm, homo °C. | ΔHm, cool J/g | Tm, stereo °C. | ΔHm, stereo J/g | Ratio of Stereocrystal % |
| Ex. 8 | 164.3, 114.9 | 40.6, 8.0 | n.d. | n.d. | 163.4 | 8.0 | 219.0 | 43.5 | 84.5 |
| Comp. Ex. 8 | n.d. | n.d. | 125.7 | 24.0 | 168.4 | 21.9 | 217.0 | 31.8 | 59.2 |
| Ex. 9 | 160.9, 114.3 | 28.1, 17.1 | n.d. | n.d. | 164.4 | 20.1 | 218.0 | 33.8 | 62.7 |
| Comp. Ex. 9 | n.d. | n.d. | 122.4 | 31.9 | 169.0 | 27.3 | 218.4 | 26.9 | 49.6 |
| Ex. 10 | 154.3, 114.3 | 13.8, 27.0 | n.d. | n.d. | 166.0 | 32.6 | 217.0 | 15.5 | 32.2 |
| Comp. Ex. 10 | n.d. | n.d. | 122.0 | 31.7 | 169.4 | 36.6 | 218.7 | 12.0 | 24.7 | n.d.: Peak was not observed.

Figure 2:
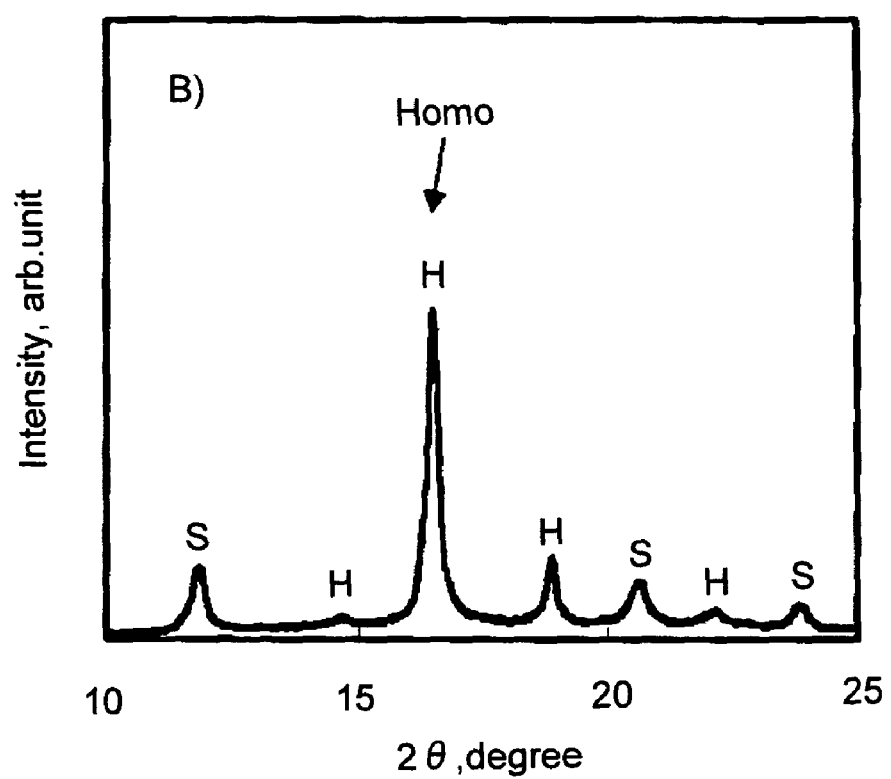
FIG. 2 shows an embodiment of an XRD chart representing a sample obtained by crystallizing a 9:1 mixture of PLLA and PDLA (polylactic acid B) by a solvent-cast method.
Figure 3:
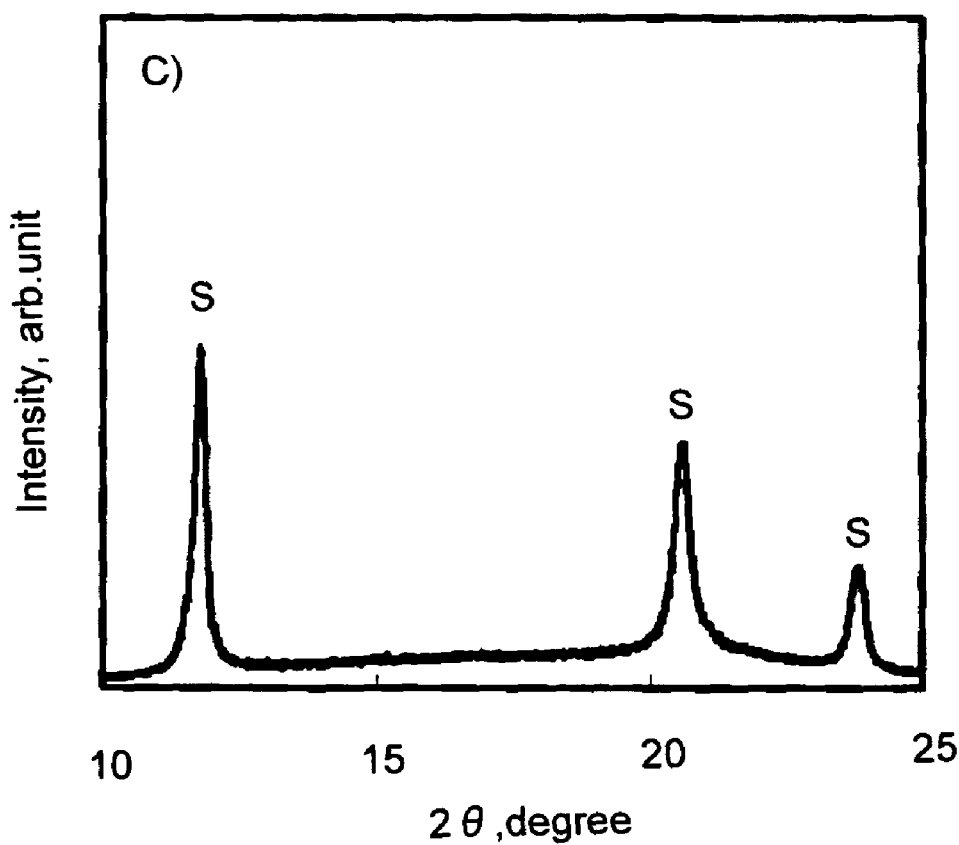
FIG. 3 shows an embodiment of an XRD chart representing a sample obtained by crystallizing a polylactic acid stereoblock copolymer (polylactic acid C) by a solvent-cast method.
Figure 4:
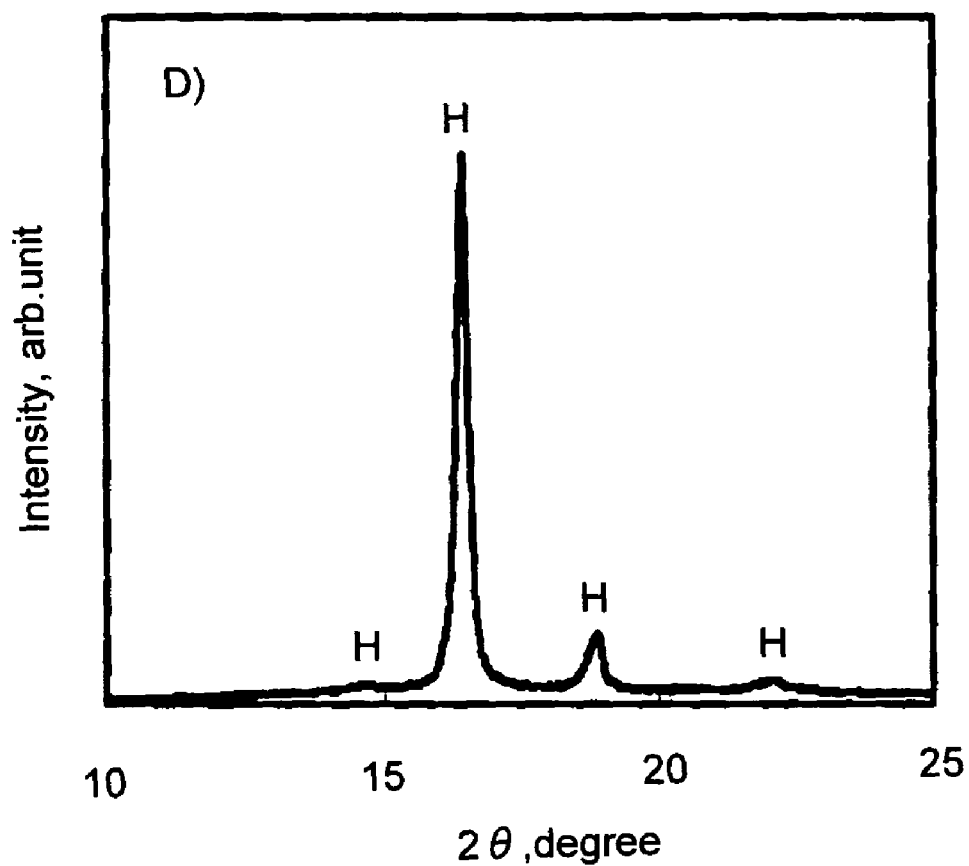
FIG. 4 shows an embodiment of an XRD chart representing a sample obtained by crystallizing PLLA (polylactic acid D) by a solvent-cast method.

As is apparent from the results shown in Tables 1 and 2 and FIGS. 1 to 3, use of the polylactic acid resin compositions of the present invention (Examples 1 to 10) resulted in the production of molded articles in which stereocomplex crystals were selectively crystallized and the effects of improving the speed and the degree of crystallization were satisfactory. In Comparative Examples 1 and 7 to 10 wherein the crystallization accelerator of the present invention was not added, however, the peak was not observed during the process of cooling, which indicates that the crystallization did not make progress. When substances other than the aromatic urea compound according to the present invention were added as crystallization accelerators (Comparative Examples 2 to 5), the ratio of stereocomplex crystal was low, and the effects of improving the speed and the degree of crystallization were insufficient. In Comparative Example 6 wherein talc was added instead of the crystallization accelerator of the present invention, the ratio of stereocomplex crystal content was low, and the effects of improving the speed and the degree of crystallization were insufficient.

INDUSTRIAL APPLICABILITY

As explained hereinbefore, the present invention provides a polylactic acid resin composition in which stereocomplex crystals of poly-L-lactic acid and poly-D-lactic acid can be selectively crystallized to obtain polylactic acid having a sufficiently high speed of crystallization, satisfactory crystallinity upon molding such as injection molding, and a sufficiently high ratio of stereocomplex crystal; and a molded article having a sufficiently high ratio of stereocomplex crystal and high crystallinity that can be obtained by melt molding and crystallizing the polylactic acid resin composition.

Therefore, the molded article obtained from the polylactic acid resin composition of the present invention has a high ratio of stereocomplex crystal and excellent heat resistance, and thus is useful as an automobile part such as a bumper, radiator grill, side molding, garnish, wheel cover, aeropart, instrument panel, door trim, sheet fabric, doorknob, or floor mat, housing for household appliances, film for product packaging, waterproof sheet, container, bottle, or the like. When the molded article of the present invention is used as a sheet, the molded article can be used as a laminate of a multi-layered structure by stacking the molded article with paper or another polymer sheet.

All publications, patents, and patent applications cited herein are incorporated herein by reference in their entirety.

What is claimed is:

1. A polylactic acid resin composition comprising polylactic acid capable of generating stereocomplex crystallization and an aromatic urea compound represented by formula (1):

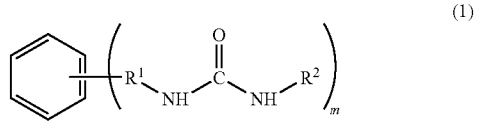

(1)

wherein $R^1$ represents an alkylene group having 1 to 10 carbon atoms; $R^2$ represents an alkyl group having 1 to 25 carbon atoms; and m is an integer between 1 to 6, and
wherein the polylactic acid capable of generating stereocomplex crystallization is
a blend of poly-L-lactic acid and poly-D-lactic acid, and the blend has a ratio of poly-L-lactic acid to poly-D-lactic acid of from 30% to 70% by weight to 70% to 30% by weight based upon a total weight of poly-L-lactic acid and poly-D-lactic lactic acid, or
a polylactic acid stereoblock copolymer, wherein the aromatic urea compound is xylylene bisstearyl urea.

2. A molded article, which is obtained by melt molding and crystallizing a polylactic acid resin composition comprising polylactic acid capable of generating stereocomplex crystallization and an aromatic urea compound represented by formula (1):

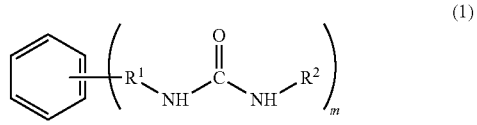

(1)

wherein $R^1$ represents an alkylene group having 1 to 10 carbon atoms; $R^2$ represents an alkyl group having 1 to 25 carbon atoms; and m is an integer between 1 to 6, and
wherein the polylactic acid capable of generating stereocomplex crystallization is
a blend of poly-L-lactic acid and poly-D-lactic acid, and the blend has a ratio of poly-L-lactic acid to poly-D-lactic acid of from 30% to 70% by weight to 70% to 30% by weight based upon a total weight of poly-L-lactic acid and poly-D-lactic lactic acid, or
a polylactic acid stereoblock copolymer, wherein the aromatic urea compound is xylylene bisstearyl urea.

3. The molded article according to claim 2, wherein the crystallization temperature (the peak top temperature) calculated based on a drop of temperature from a molten state (cooling rate: 20° C./min) measured by DSC is 140° C. or higher and having the calorific power caused by the crystallization calculated based on the measurements via cooling (peak calorific power) is 0.2X J/g or more, wherein X is two times the smaller value of either the content (A%) of poly-L-lactic acid or the content (B%) of poly-D-lactic acid, provided that A+B=100%.

4. The molded article according to claim 3, wherein the aromatic urea compound is xylylene bisstearyl urea.

* * * * *

UNITED STATES PATENT AND TRADEMARK OFFICE
CERTIFICATE OF CORRECTION

| | | |
|---|---|---|
| PATENT NO. | : 7,825,212 B2 | Page 1 of 1 |
| APPLICATION NO. | : 10/584471 | |
| DATED | : November 2, 2010 | |
| INVENTOR(S) | : Makoto Ouchi et al. | |

It is certified that error appears in the above-identified patent and that said Letters Patent is hereby corrected as shown below:

Please amend the title page as follows:

Item (54), please change "POLYLACTIC ACID RESIN AND COMPOSITION AND MOLDED ARTICLE OF THE SAME" to -- POLYLACTIC ACID RESIN COMPOSITION AND MOLDED ARTICLE OF THE SAME --.

Signed and Sealed this
Twenty-fifth Day of January, 2011

David J. Kappos
*Director of the United States Patent and Trademark Office*

UNITED STATES PATENT AND TRADEMARK OFFICE
CERTIFICATE OF CORRECTION

PATENT NO. : 7,825,212 B2  Page 1 of 1
APPLICATION NO. : 10/584471
DATED : November 2, 2010
INVENTOR(S) : Makoto Ouchi et al.

It is certified that error appears in the above-identified patent and that said Letters Patent is hereby corrected as shown below:

Please amend the title page, Item (54) and at Column 1, lines 1-3, title as follows:

please change "POLYLACTIC ACID RESIN AND COMPOSITION AND MOLDED ARTICLE OF THE SAME" to -- POLYLACTIC ACID RESIN COMPOSITION AND MOLDED ARTICLE OF THE SAME --.

This certificate supersedes the Certificate of Correction issued January 25, 2011.

Signed and Sealed this
Fifteenth Day of February, 2011

David J. Kappos
*Director of the United States Patent and Trademark Office*